(12) United States Patent
Paykin et al.

(10) Patent No.: US 12,307,989 B2
(45) Date of Patent: May 20, 2025

(54) DRIVING SEQUENCES TO REMOVE PRIOR STATE INFORMATION FROM COLOR ELECTROPHORETIC DISPLAYS

(71) Applicant: E INK CORPORATION, Billerica, MA (US)

(72) Inventors: Irina Paykin, Billerica, MA (US); Stephen J. Telfer, Arlington, MA (US); Kenneth R. Crounse, Somerville, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/226,931

(22) Filed: Jul. 27, 2023

(65) Prior Publication Data

US 2023/0386421 A1    Nov. 30, 2023

Related U.S. Application Data

(63) Continuation of application No. 17/514,574, filed on Oct. 29, 2021, now Pat. No. 11,756,494.
(Continued)

(51) Int. Cl.
*G09G 3/34*    (2006.01)
*G02F 1/167*    (2019.01)
*G02F 1/16757*    (2019.01)

(52) U.S. Cl.
CPC ............. *G09G 3/344* (2013.01); *G02F 1/167* (2013.01); *G02F 1/16757* (2019.01); *G09G 2300/0842* (2013.01); *G09G 2310/063* (2013.01); *G09G 2310/068* (2013.01); *G09G 2320/0204* (2013.01); *G09G 2320/0242* (2013.01);
(Continued)

(58) Field of Classification Search
CPC ........... G09G 3/344; G09G 2300/0842; G09G 2310/063; G09G 2320/0204; G09G 2300/08; G09G 2310/068; G09G 2320/0242; G09G 2320/0252; G09G 2320/0257; G02F 1/167; G02F 1/16757; G02F 1/1685; G02F 2001/1678
See application file for complete search history.

(56) References Cited

U.S. PATENT DOCUMENTS 4,418,346 A    11/1983    Batchelder
5,872,552 A    2/1999    Gordon, II et al.
(Continued)

FOREIGN PATENT DOCUMENTS

JP    2017021274 A    1/2017
KR    20090126536 A    12/2009

OTHER PUBLICATIONS

European Patent Office, "Extended European Search Report", EP Appl. No. 21887631.6, Apr. 24, 2024.
(Continued)

*Primary Examiner* — Adam R. Giesy
(74) *Attorney, Agent, or Firm* — Brian D. Bean

(57) ABSTRACT

Methods for efficiently clearing previous state information when driving a multi-particle color electrophoretic medium, for example, wherein at least two of the particles are colored and subtractive and at least one of the particles is scattering. Typically, such a system includes a white particle and cyan, yellow, and magenta subtractive primary colored particles. The clearing pulse may include two different portions of alternating impulses and the overall waveform may be DC balanced.

9 Claims, 12 Drawing Sheets

Related U.S. Application Data

(60) Provisional application No. 63/108,713, filed on Nov. 2, 2020.

(52) U.S. Cl.
CPC .............. *G09G 2320/0252* (2013.01); *G09G 2320/0257* (2013.01)

(56) References Cited

U.S. PATENT DOCUMENTS

| | | | |
|---|---|---|---|
| 5,930,026 A | 7/1999 | Jacobson |
| 6,017,584 A | 1/2000 | Albert et al. |
| 6,130,774 A | 10/2000 | Albert et al. |
| 6,144,361 A | 11/2000 | Gordon, II |
| 6,184,856 B1 | 2/2001 | Gordon, II |
| 6,225,971 B1 | 5/2001 | Gordon, II |
| 6,241,921 B1 | 6/2001 | Jacobson et al. |
| 6,271,823 B1 | 8/2001 | Gordon, II |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,545,797 B2 | 4/2003 | Chen et al. |
| 6,664,944 B1 | 12/2003 | Albert et al. |
| 6,672,921 B1 | 1/2004 | Liang et al. |
| 6,727,873 B2 | 4/2004 | Gordon, II |
| 6,753,999 B2 | 6/2004 | Zehner et al. |
| 6,788,449 B2 | 9/2004 | Liang et al. |
| 6,788,452 B2 | 9/2004 | Liang et al. |
| 6,825,970 B2 | 11/2004 | Goenaga et al. |
| 6,866,760 B2 | 3/2005 | Paolini, Jr. et al. |
| 6,900,851 B2 | 5/2005 | Morrison et al. |
| 6,922,276 B2 | 7/2005 | Zhang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,038,656 B2 | 5/2006 | Liang et al. |
| 7,038,670 B2 | 5/2006 | Liang et al. |
| 7,046,228 B2 | 5/2006 | Liang et al. |
| 7,052,571 B2 | 5/2006 | Wang et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,167,155 B1 | 1/2007 | Albert et al. |
| 7,170,670 B2 | 1/2007 | Webber |
| 7,176,880 B2 | 2/2007 | Amundson et al. |
| 7,177,066 B2 | 2/2007 | Chung et al. |
| 7,193,625 B2 | 3/2007 | Danner et al. |
| 7,202,847 B2 | 4/2007 | Gates |
| 7,242,514 B2 | 7/2007 | Chung et al. |
| 7,259,744 B2 | 8/2007 | Arango et al. |
| 7,312,784 B2 | 12/2007 | Baucom et al. |
| 7,327,511 B2 | 2/2008 | Whitesides et al. |
| 7,339,715 B2 | 3/2008 | Webber et al. |
| 7,385,751 B2 | 6/2008 | Chen et al. |
| 7,408,699 B2 | 8/2008 | Wang et al. |
| 7,411,719 B2 | 8/2008 | Paolini, Jr. et al. |
| 7,453,445 B2 | 11/2008 | Amundson |
| 7,492,339 B2 | 2/2009 | Amundson |
| 7,492,505 B2 | 2/2009 | Liang et al. |
| 7,499,211 B2 | 3/2009 | Suwabe et al. |
| 7,528,822 B2 | 5/2009 | Amundson et al. |
| 7,535,624 B2 | 5/2009 | Amundson et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,684,108 B2 | 3/2010 | Wang et al. |
| 7,715,088 B2 | 5/2010 | Liang et al. |
| 7,787,169 B2 | 8/2010 | Abramson et al. |
| 7,800,580 B2 | 9/2010 | Johnson |
| 7,800,813 B2 | 9/2010 | Wu et al. |
| 7,821,702 B2 | 10/2010 | Liang et al. |
| 7,839,564 B2 | 11/2010 | Whitesides et al. |
| 7,848,009 B2 | 12/2010 | Machida et al. |
| 7,859,742 B1 | 12/2010 | Chiu et al. |
| 7,885,457 B2 | 2/2011 | Hirano et al. |
| 7,910,175 B2 | 3/2011 | Webber |
| 7,952,557 B2 | 5/2011 | Amundson |
| 7,952,790 B2 | 5/2011 | Honeyman et al. |
| 7,956,841 B2 | 6/2011 | Albert et al. |
| 7,982,479 B2 | 7/2011 | Wang et al. |
| 7,982,941 B2 | 7/2011 | Lin et al. |
| 7,999,787 B2 | 8/2011 | Amundson et al. |
| 8,009,348 B2 | 8/2011 | Zehner et al. |
| 8,023,176 B2 | 9/2011 | Akashi et al. |
| 8,031,392 B2 | 10/2011 | Hiji et al. |
| 8,040,594 B2 | 10/2011 | Paolini, Jr. et al. |
| 8,054,526 B2 | 11/2011 | Bouchard |
| 8,077,141 B2 | 12/2011 | Duthaler et al. |
| 8,098,418 B2 | 1/2012 | Paolini, Jr. et al. |
| 8,125,501 B2 | 2/2012 | Amundson et al. |
| 8,139,050 B2 | 3/2012 | Jacobson et al. |
| 8,159,636 B2 | 4/2012 | Sun et al. |
| 8,174,490 B2 | 5/2012 | Whitesides et al. |
| 8,174,491 B2 | 5/2012 | Machida et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,314,784 B2 | 11/2012 | Ohkami et al. |
| 8,363,299 B2 | 1/2013 | Paolini, Jr. et al. |
| 8,373,649 B2 | 2/2013 | Low et al. |
| 8,384,658 B2 | 2/2013 | Albert et al. |
| 8,422,116 B2 | 4/2013 | Sprague et al. |
| 8,441,714 B2 | 5/2013 | Paolini, Jr. et al. |
| 8,441,716 B2 | 5/2013 | Paolini, Jr. et al. |
| 8,456,414 B2 | 6/2013 | Lin et al. |
| 8,462,102 B2 | 6/2013 | Wong et al. |
| 8,503,063 B2 | 8/2013 | Sprague |
| 8,514,168 B2 | 8/2013 | Chung et al. |
| 8,537,105 B2 | 9/2013 | Chiu et al. |
| 8,542,431 B2 | 9/2013 | Shuto et al. |
| 8,558,783 B2 | 10/2013 | Wilcox et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,576,470 B2 | 11/2013 | Paolini, Jr. et al. |
| 8,576,475 B2 | 11/2013 | Huang et al. |
| 8,576,476 B2 | 11/2013 | Telfer et al. |
| 8,587,859 B2 | 11/2013 | Kayashima et al. |
| 8,605,032 B2 | 12/2013 | Liu et al. |
| 8,605,354 B2 | 12/2013 | Zhang et al. |
| 8,649,084 B2 | 2/2014 | Wang et al. |
| 8,665,206 B2 | 3/2014 | Lin et al. |
| 8,670,174 B2 | 3/2014 | Sprague et al. |
| 8,681,191 B2 | 3/2014 | Yang et al. |
| 8,704,754 B2 | 4/2014 | Machida et al. |
| 8,704,756 B2 | 4/2014 | Lin |
| 8,717,664 B2 | 5/2014 | Wang et al. |
| 8,730,216 B2 | 5/2014 | Mizutani et al. |
| 8,786,935 B2 | 7/2014 | Sprague |
| 8,797,634 B2 | 8/2014 | Paolini, Jr. et al. |
| 8,810,525 B2 | 8/2014 | Sprague |
| 8,810,899 B2 | 8/2014 | Sprague et al. |
| 8,873,129 B2 | 10/2014 | Paolini, Jr. et al. |
| 8,902,153 B2 | 12/2014 | Bouchard et al. |
| 8,902,491 B2 | 12/2014 | Wang et al. |
| 8,917,439 B2 | 12/2014 | Wang et al. |
| 8,928,562 B2 | 1/2015 | Gates et al. |
| 8,928,641 B2 | 1/2015 | Chiu et al. |
| 8,964,282 B2 | 2/2015 | Wang et al. |
| 8,976,444 B2 | 3/2015 | Zhang et al. |

(56) References Cited

U.S. PATENT DOCUMENTS

| | | |
|---|---|---|
| 9,013,394 B2 | 4/2015 | Lin |
| 9,013,783 B2 | 4/2015 | Sprague |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,116,412 B2 | 8/2015 | Lin |
| 9,146,439 B2 | 9/2015 | Zhang |
| 9,152,005 B2 | 10/2015 | Morikawa et al. |
| 9,170,468 B2 | 10/2015 | Lin et al. |
| 9,171,508 B2 | 10/2015 | Sprague et al. |
| 9,182,646 B2 | 11/2015 | Paolini, Jr. et al. |
| 9,195,111 B2 | 11/2015 | Anseth et al. |
| 9,199,441 B2 | 12/2015 | Danner |
| 9,218,773 B2 | 12/2015 | Sun et al. |
| 9,224,338 B2 | 12/2015 | Chan et al. |
| 9,224,342 B2 | 12/2015 | Sprague et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,268,191 B2 | 2/2016 | Paolini, Jr. et al. |
| 9,279,906 B2 | 3/2016 | Kang |
| 9,285,649 B2 | 3/2016 | Du et al. |
| 9,299,294 B2 | 3/2016 | Lin et al. |
| 9,348,193 B2 | 5/2016 | Hiji et al. |
| 9,360,733 B2 | 6/2016 | Wang et al. |
| 9,361,836 B1 | 6/2016 | Telfer et al. |
| 9,373,289 B2 | 6/2016 | Sprague et al. |
| 9,383,623 B2 | 7/2016 | Lin et al. |
| 9,390,066 B2 | 7/2016 | Smith |
| 9,390,661 B2 | 7/2016 | Chiu et al. |
| 9,423,666 B2 | 8/2016 | Wang et al. |
| 9,429,810 B2 | 8/2016 | Kaino |
| 9,436,056 B2 | 9/2016 | Paolini, Jr. et al. |
| 9,459,510 B2 | 10/2016 | Lin |
| 9,460,666 B2 | 10/2016 | Sprague et al. |
| 9,495,918 B2 | 11/2016 | Harrington et al. |
| 9,501,981 B2 | 11/2016 | Lin et al. |
| 9,513,527 B2 | 12/2016 | Chan et al. |
| 9,513,743 B2 | 12/2016 | Sjodin et al. |
| 9,514,667 B2 | 12/2016 | Lin |
| 9,541,814 B2 | 1/2017 | Lin et al. |
| 9,612,502 B2 | 4/2017 | Danner et al. |
| 9,620,048 B2 | 4/2017 | Sim et al. |
| 9,640,119 B2 | 5/2017 | Lin et al. |
| 9,671,668 B2 | 6/2017 | Chan et al. |
| 9,672,766 B2 | 6/2017 | Sjodin |
| 9,691,333 B2 | 6/2017 | Cheng et al. |
| 9,697,778 B2 | 7/2017 | Telfer et al. |
| 9,721,495 B2 | 8/2017 | Harrington et al. |
| 9,740,076 B2 | 8/2017 | Paolini et al. |
| 9,759,980 B2 | 9/2017 | Du et al. |
| 9,792,861 B2 | 10/2017 | Chang et al. |
| 9,792,862 B2 | 10/2017 | Hung et al. |
| 9,812,073 B2 | 11/2017 | Lin et al. |
| 9,921,451 B2 | 3/2018 | Telfer et al. |
| 10,031,394 B2 | 7/2018 | Nakayama et al. |
| 10,162,242 B2 | 12/2018 | Wang et al. |
| 10,186,212 B2 | 1/2019 | Carneiro et al. |
| 10,209,556 B2 | 2/2019 | Rosenfeld et al. |
| 10,229,641 B2 | 3/2019 | Yang et al. |
| 10,276,109 B2 | 4/2019 | Crounse et al. |
| 10,319,313 B2 | 6/2019 | Harris et al. |
| 10,332,435 B2 | 6/2019 | Wang et al. |
| 10,339,876 B2 | 7/2019 | Lin et al. |
| 10,353,266 B2 | 7/2019 | Bouchard et al. |
| 10,444,553 B2 | 10/2019 | Laxton |
| 10,467,984 B2 | 11/2019 | Buckley et al. |
| 10,514,583 B2 | 12/2019 | Zhang |
| 10,593,272 B2 | 3/2020 | Telfer et al. |
| 10,672,350 B2 | 6/2020 | Amundson et al. |
| 10,852,568 B2 | 12/2020 | Crounse et al. |
| 11,151,951 B2 | 10/2021 | Lin et al. |
| 2003/0102858 A1 | 6/2003 | Jacobson et al. |
| 2004/0246562 A1 | 12/2004 | Chung et al. |
| 2005/0253777 A1 | 11/2005 | Zehner et al. |
| 2006/0227196 A1 | 10/2006 | Zhou et al. |
| 2007/0103427 A1 | 5/2007 | Zhou et al. |
| 2007/0176912 A1 | 8/2007 | Beames et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0136774 A1 | 6/2008 | Harris et al. |
| 2008/0165120 A1 | 7/2008 | Johnson |
| 2008/0303780 A1 | 12/2008 | Sprague et al. |
| 2009/0225398 A1 | 9/2009 | Duthaler et al. |
| 2010/0060628 A1 | 3/2010 | Lenssen et al. |
| 2010/0156780 A1 | 6/2010 | Jacobson et al. |
| 2010/0194733 A1 | 8/2010 | Lin et al. |
| 2010/0194789 A1 | 8/2010 | Lin et al. |
| 2010/0265561 A1 | 10/2010 | Gates et al. |
| 2011/0043543 A1 | 2/2011 | Chen et al. |
| 2011/0063314 A1 | 3/2011 | Chiu et al. |
| 2011/0128267 A1 | 6/2011 | Hsu |
| 2011/0175875 A1 | 7/2011 | Lin et al. |
| 2011/0175939 A1 | 7/2011 | Moriyama et al. |
| 2011/0221740 A1 | 9/2011 | Yang et al. |
| 2012/0001957 A1 | 1/2012 | Liu et al. |
| 2012/0098740 A1 | 4/2012 | Chiu et al. |
| 2013/0063333 A1 | 3/2013 | Arango et al. |
| 2013/0222884 A1 | 8/2013 | Moriyama et al. |
| 2013/0222886 A1 | 8/2013 | Kawahara et al. |
| 2013/0222888 A1 | 8/2013 | Urano |
| 2013/0242378 A1 | 9/2013 | Paolini, Jr. et al. |
| 2013/0249782 A1 | 9/2013 | Wu et al. |
| 2014/0055840 A1 | 2/2014 | Zang et al. |
| 2014/0078576 A1 | 3/2014 | Sprague |
| 2014/0204012 A1 | 7/2014 | Wu et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2014/0362213 A1 | 12/2014 | Tseng |
| 2015/0005720 A1 | 1/2015 | Zang et al. |
| 2015/0262255 A1 | 9/2015 | Khajehnouri |
| 2015/0268531 A1 | 9/2015 | Wang et al. |
| 2015/0301246 A1 | 10/2015 | Zang et al. |
| 2016/0012710 A1 | 1/2016 | Lu et al. |
| 2016/0085132 A1* | 3/2016 | Telfer ............... G02F 1/167 359/296 |
| 2016/0180777 A1 | 6/2016 | Lin et al. |
| 2019/0172401 A1 | 6/2019 | Sim et al. |

OTHER PUBLICATIONS

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Heikenfeld, J. et al., "A critical review of the present and future prospects for electronic paper", SID, 19(2), pp. 129-156 (2011).

Korean Intellectual Property Office, "International Search Report and Written Opinion", PCT/US2021/057335, Feb. 18, 2022.

* cited by examiner

|  |  |  |  |  |  |  |
|---|---|---|---|---|---|---|
| White | Yellow | Magenta | | | Cyan | |
| Cyan | White | Yellow | Magenta | | Yellow | Magenta |
| Magenta | Cyan | White | Cyan | Magenta | Cyan | Yellow |
| Yellow | Magenta | Cyan | White | White | White | White |
| | Yellow | | Magenta | Magenta | | |
| | | | Yellow | Yellow | | |

| White | Yellow | Red | Magenta | Blue | Cyan | Green | Black |
|---|---|---|---|---|---|---|---|
| [A] | [B] | [C] | [D] | [E] | [F] | [G] | [H] |

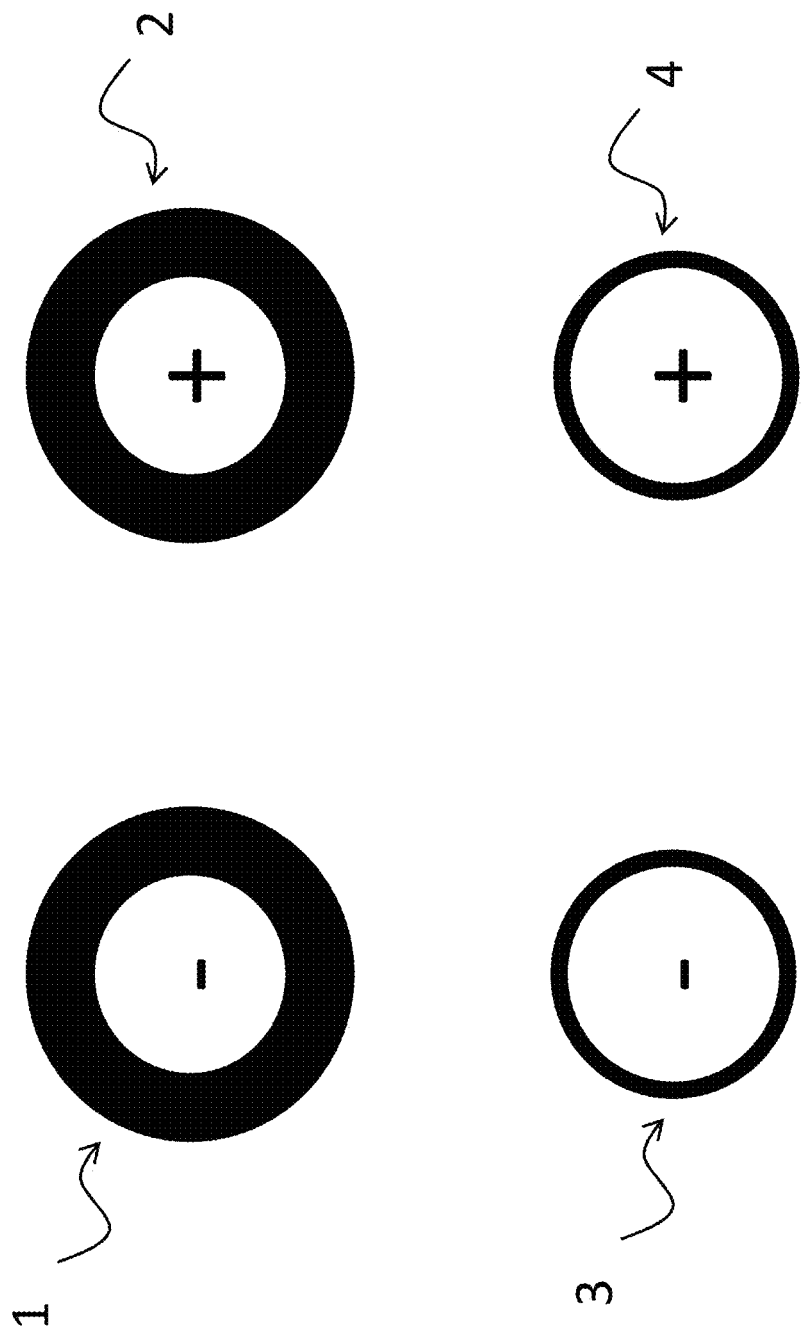

DRIVING SEQUENCES TO REMOVE PRIOR STATE INFORMATION FROM COLOR ELECTROPHORETIC DISPLAYS

RELATED APPLICATIONS

This application is a continuation application of U.S. Ser. No. 17/514,574, filed on Oct. 29, 2021 (published as U.S. Patent Publication No. 2022/0139338), which claims priority to U.S. Provisional Patent Application No. 63/108,713, filed Nov. 2, 2020. The contents of all patents and publications disclosed herein are incorporated by reference in their entireties.

BACKGROUND OF INVENTION

This invention relates to methods for driving electro-optic displays, especially but not exclusively electrophoretic displays capable of rendering more than two colors using a single layer of electrophoretic material comprising a plurality of colored particles, for example white, cyan, yellow, and magenta absorptive particles, wherein two particles are positively-charged and two particles are negatively-charged, and one positively-charged particle and one negatively-charged particle has a thick polymer shell.

Other color and charge combinations are possible, and may be better suited for different applications. For example, three-color displays (black, white, red; black white, yellow), four-color displays (black, white, red, yellow), and five-color displays (black, white, red, yellow, blue) are achievable. In some embodiments, all of these particles (except for black) are reflective/scattering, resulting in reliable, saturated colors, well suited for advertising. In other embodiments, only one of the particles is reflective (e.g., white) while the remaining particles are absorptive, resulting in a larger color gamut. In some applications, the number of positive particles sets are not balanced with the number of negative particle sets. For example, a four particle display may include one negative white particle set and three positive particle sets, which may be, for example, cyan, magenta, and yellow.

Similar to the operation of black and white electrophoretic displays, electrophoretic displays with three or four reflective pigments operate similar to the simple black and white displays because the desired color particle is driven to the viewing surface. The driving schemes are far more complicated than only black and white, but in the end, the optical function of the particles is the same.

Advanced Color electronic Paper (ACeP®) is a particular type of color electrophoretic display sold by E Ink Corporation that includes four particles, where the cyan, yellow, and magenta particles are subtractive rather than reflective, thereby allowing thousands of colors to be produced at each pixel. (ACeP-type display refers to a four particle system wherein one particle is scattering, and the others are subtractive.) The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta and white particles with respect to the viewing surface will determine the color at each pixel. While this type of electrophoretic display allows for thousands of colors at each pixel, it is critical to carefully control the position of each of the (50 to 500 nanometer-sized) pigments within a working space of about 10 to 20 micrometers in thickness. Obviously, variations in the position of the pigments will result in incorrect colors being displayed at a given pixel. Accordingly, exquisite voltage control is required for such a system. More details of this system are available in the following U.S. Patents, all of which are incorporated by reference in their entireties: U.S. Pat. Nos. 9,361,836, 9,921,451, 10,276,109, 10,353, 266, 10,467,984, and 10,593,272.

U.S. Pat. No. 10,593, 272 describes specific waveforms for clearing prior states in an ACeP-type electrophoretic display, especially an ACeP-type electrophoretic display using top plane switching. A driving figure from U.S. Pat. No. 10,593,272 is reproduced as FIG. 1. In FIG. 1, a generic waveform for addressing an ACeP-type color electrophoretic display is illustrated, in which the abscissa represents time (in arbitrary units) and the ordinate represents the voltage difference between a pixel electrode and the common front electrode. The magnitudes of the three positive voltages used in the drive scheme illustrated in FIG. 1 may lie between about +3V and +30V, and of the three negative voltages between about −3V and −30V The prior art teaches two distinct phases where supplied pulses at $+V_{max}$ and $-V_{max}$ that serve to erase the previous image rendered on the display (i.e., to "reset" the display). The lengths of these pulses ($t_1$ and $t_3$) and of the rests (i.e., periods of zero voltage between them ($t_2$ and $t_4$) may be chosen so that the entire waveform (i.e., the integral of voltage with respect to time over the whole waveform as illustrated in FIG. 1) is DC balanced (i.e., the integral of voltage over time is substantially zero). Notably, the magnitude $+V_{max}$ and $-V_{max}$ are matched, allowing for easier DC balancing.

Prior art reset pulses of the type shown in FIG. 1 use a phase comprising a high-voltage dipole for setting the initial conditions of the waveform and for DC-balancing the overall transition. This DC-balancing phase precedes the sequence of pulses used to form the desired final color. The DC-balancing portion of the waveform is composed of at least two pulses: one positive, and one negative, and the net impulse of the DC-balancing portion of the waveform is equal and opposite to the net impulse of the color-forming pulses that follow it.

With time, it has become evident that waveforms of the type shown in FIG. 1 have certain disadvantages. In particular, waveforms similar to FIG. 1 have high levels of "ghosting" (i.e., prior state influence on the end optical state). As a result, many transitions from a first optical state to a second optical state require additional prior clearing, for example by inserting a transition to the white state between two colored image transitions. Additional "trips" through the white state can result in very long total transition times, up to 20 seconds. Additionally, in experiments in which single push-pull sequences were used to make colors (i.e., using waveforms lacking the reset/DC-balancing phase of a conventional waveform) it was found that only certain direct transitions from one color to another were possible. In particular, it was not possible to make a direct transition from any color with a yellow component (i.e., yellow, green, red and black) to any color with no yellow component apart from magenta (i.e., blue, cyan and white).

One suggested mechanism for the ghosting and null color transitions is unwanted polarization of one or more pigments during the previous updates. In particular, as described in U.S. Pat. No. 9,697,778, which is incorporated by reference, it was shown that negatively-charged, polymer functionalized titania particles can be polarized to such a degree that their electrophoretic mobility actually flips. This behavior is likely due to accumulation of charge control agents on the surface of the white pigment as well as other non-linear behavior including the temporary creation of localized spheres of countercharges around the titania particles. Accordingly, it is theorized that adding a transition to the white state during all waveform updates normalizes the electrophoretic mobility of the particles and helps the electrophoretic material achieve a neutral state from which all subsequent colors are accessible. It is possible that other particles sets are also becoming polarized after being driven to prior color states, and driving the electrophoretic medium to the white state is also negating these unwanted polarizations.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based. electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788, 452; 6,864,875; 6,914,714; 6,972,893; 7,038,656; 7,038,670; 7,046,228; 7,052,571; 7,075,502; 7,167, 155; 7,385,751, 7,492,505; 7,667,684; 7,684,108; 7,791,789; 7,800,813; 7,821,702; 7,839,564; 7,910, 175; 7,952,790; 7,956,841; 7,982,941; 8,040,594; 8,054,526, 8,098,418; 8,159,636; 8,213,076; 8,363, 299; 8,422,116; 8.441.714; 8,441,716; 8,466,852; 8,503,063; 8,576,470; 8,576,475; 8,593,721; 8,605, 354; 8,649,084; 8,670,174; 8,704,756; 8,717,664; 8,786,935; 8,797,634; 8,810,899; 8,830,559; 8,873, 129; 8,902,153; 8,902,491; 8,917,439; 8,964,282; 9,013,783; 9,116,412; 9,146,439; 9,164,207; 9,170, 467; 9,170,468; 9,182,646; 9,195,111; 9,199,441; 9,268,191; 9,285,649; 9,293,511; 9,341,916; 9,360, 733; 9,361,836; 9,383,623; and 9,423,666; and U.S. Patent Applications Publication Nos. 2008/0043318; 2008/0048970; 2009/0225398; 2010/0156780; 2011/ 0043543; 2012/0326957; 2013/0242378; 2013/ 0278995; 2014/0055840; 2014/0078576; 2014/ 0340430; 2014/0340736; 2014/0362213; 2015/ 0103394; 2015/0118390; 2015/0124345; 2015/ 0198858; 2015/0234250; 2015/0268531; 2015/ 0301246; 2016/0011484; 2016/0026062; 2016/ 0048054; 2016/0116816; 2016/0116818; and 2016/ 0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995, 550; 7,012,600; 7,023,420; 7,034,783; 7,061,166; 7,061,662; 7,116,466; 7,119,772; 7,177,066; 7,193, 625; 7,202,847; 7,242,514; 7,259,744; 7,304,787; 7,312,794; 7,327,511; 7,408,699; 7,453,445; 7,492, 339; 7,528,822; 7,545,358; 7,583,251; 7,602,374; 7,612,760; 7,679,599; 7,679,813; 7,683,606; 7,688, 297; 7,729,039; 7,733,311; 7,733,335; 7,787,169; 7,859,742; 7,952,557; 7,956,841; 7,982,479; 7,999, 787; 8,077,141; 8,125,501; 8,139,050; 8,174,490; 8,243,013; 8,274,472; 8,289.250; 8,300,006; 8,305, 341; 8,314,784; 8,373,649; 8,384,658; 8,456,414; 8,462,102; 8,514,168; 8,537,105; 8,558,783; 8,558, 785; 8,558,786; 8,558,855; 8,576,164; 8,576,259; 8,593,396; 8,605,032; 8,643,595; 8,665,206; 8,681, 191; 8,730,153; 8,810,525; 8,928,562; 8,928,641; 8,976,444; 9,013,394; 9,019,197; 9,019,198; 9,019, 318; 9,082,352; 9,171,508; 9,218,773; 9,224,338; 9,224,342; 9,224,344; 9,230,492; 9,251,736; 9,262, 973; 9,269,311; 9,299,294; 9,373,289; 9,390,066; 9,390,661; and 9,412,314; and U.S. Patent Applications Publication Nos, 2003/0102858; 2004/0246562; 2005/ 0253777; 2007/0091418; 2007/0103427; 2007/ 0176912; 2008/0024429; 2008/0024482; 2008/ 0136774; 2008/0291129; 2008/0303780; 2009/ 0174651; 2009/0195568; 2009/0322721; 2010/ 0194733; 2010/0194789; 2010/0220121; 2010/ 0265561; 2010/0283804; 2011/0063314; 2011/ 0175875; 2011/0193840; 2011/0193841; 2011/ 0199671; 2011/0221740; 2012/0001957; 2012/ 0098740; 2013/0063333; 2013/0194250; 2013/ 0249782; 2013/0321278; 2014/0009817; 2014/

0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777 (these patents and applications may hereinafter be referred to as the MEDEOD (MEthods for Driving Electro-optic Displays) applications);

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to SiPix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sliming is especially problematic when mixing yellow because it is lighter than any other color of equal brightness, and saturated yellow is almost as bright as white. Switching the blue pixels (one fourth of the display area) to black makes the yellow too dark.

Multilayer, stacked electrophoretic displays are known in the art; see, for example, J. Heikenfeld, P. Drzaic, J-S Yeo and T. Koch, Journal of the SID, 19(2), 2011, pp. 129-156.

In such displays, ambient light passes through images in each of the three subtractive primary colors, in precise analogy with conventional color printing. U.S. Pat. No. 6,727,873 describes a stacked electrophoretic display in which three layers of switchable cells are placed over a reflective background. Similar displays are known in which colored particles are moved laterally (see International Application No. WO 2008/065605) or, using a combination of vertical and lateral motion, sequestered into microcells. In both cases, each layer is provided with electrodes that serve to concentrate or disperse the colored particles on a pixel-by-pixel basis, so that each of the three layers requires a layer of thin-film transistors (TFT's) (two of the three layers of TFT's must be substantially transparent) and a light-transmissive counter-electrode. Such a complex arrangement of electrodes is costly to manufacture, and in the present state of the art it is difficult to provide an adequately transparent plane of pixel electrodes, especially as the white state of the display must be viewed through several layers of electrodes. Multi-layer displays also suffer from parallax problems as the thickness of the display stack approaches or exceeds the pixel size.

U.S. Applications Publication Nos. 2012/0008188 and 2012/0134009 describe multicolor electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Patent Application Publication No. 2013/0208338 describes a color display comprising an electrophoretic fluid which comprises one or two types of pigment particles dispersed in a clear and colorless or colored solvent, the electrophoretic fluid being disposed between a common electrode and a plurality of pixel or driving electrodes. The driving electrodes are arranged to expose a background layer. U.S. Patent Application Publication No. 2014/0177031 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage which is about 1 to about 20% of the full driving voltage. U.S. Patent Application Publication No. 2014/0092465 and 2014/0092466 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third. type of pigment particles has a charge level being less than about 50% of the charge level of the first or second type. The three types of pigment particles have different levels of threshold voltage, or different levels of mobility, or both. None of these patent applications disclose full color display in the sense in which that term is used below.

U.S. Patent Application Publication No. 2007/0031031 describes an image processing device for processing image data in order to display an image on a display medium in which each pixel is capable of displaying white, black and one other color. U.S. Patent Applications Publication Nos. 2008/0151355; 2010/0188732; and 2011/0279885 describe a color display in which mobile particles move through a porous structure. U.S. Patent Applications Publication Nos. 2008/0303779 and 2010/0020384 describe a display medium comprising first, second and third particles of differing colors. The first and second particles can form aggregates, and the smaller third particles can move through apertures left between the aggregated first and second particles. U.S. Patent Application Publication No. 2011/0134506 describes a display device including an electrophoretic display element including plural types of particles enclosed between a pair of substrates, at least one of the substrates being translucent and each of the respective plural types of particles being charged with the same polarity, differing in optical properties, and differing in either in migration speed and/or electric field threshold value for moving, a translucent display-side electrode provided at the substrate side where the translucent substrate is disposed, a first back-side electrode provided at the side of the other substrate, facing the display-side electrode, and a second back-side electrode provided at the side of the other substrate, facing the display-side electrode; and a voltage control section that controls the voltages applied to the display-side electrode, the first back-side electrode, and the second back-side electrode, such that the types of particles having the fastest migration speed from the plural types of particles, or the types of particles having the lowest threshold value from the plural types of particles, are moved, in sequence by each of the different types of particles, to the first back-side electrode or to the second back-side electrode, and then the particles that moved to the first back-side electrode are moved to the display-side electrode. U.S. Patent Applications Publication Nos. 2011/0175939; 2011/0298835; 2012/0327504; and 2012/0139966 describe color displays which rely upon aggregation of multiple particles and threshold voltages. U.S. Patent Application Publication No. 2013/0222884 describes an electrophoretic particle, which contains a colored particle containing a charged group-containing polymer and a coloring agent, and a branched silicone-based polymer being attached to the colored particle and containing, as copolymerization components, a reactive monomer and at least one monomer selected from a specific group of monomers. U.S. Patent Application Publication No. 2013/0222885 describes a dispersion liquid for an electrophoretic display containing a dispersion medium, a colored electrophoretic particle group dispersed in the dispersion medium and migrates in an electric field, a non-electrophoretic particle group which does not migrate and has a color different from that of the electrophoretic particle group, and a compound having a neutral polar group and a hydrophobic group, which is contained in the dispersion medium in a ratio of about 0.01 to about 1 mass % based on the entire dispersion liquid. U.S. Patent Application Publication No. 2013/0222886 describes a dispersion liquid for a display including floating particles containing: core particles including a colorant and a hydrophilic resin; and a shell covering a surface of each of the core particles and containing a hydrophobic resin with a difference in a solubility parameter of 7.95 $(J/cm^3)^{1/2}$ or more. U.S. Patent Applications Publication Nos. 2013/0222887 and 2013/0222888 describe an electrophoretic particle having specified chemical compositions. Finally, U.S. Patent Application Publication No. 2014/0104675 describes a particle dispersion including first and second colored particles that move in response to an electric field, and a dispersion medium, the second colored particles having a larger diameter than the first colored particles and the same charging characteristic as a charging characteristic of the first color particles, and in which the ratio (Cs/Cl) of the charge amount Cs of the first colored particles to the charge amount Cl of the second colored particles per unit area of the display is less than or equal to 5. Some of the aforementioned displays do provide full color but at the cost of requiring addressing methods that are long and cumbersome.

U.S. Patent Applications Publication Nos. 2012/0314273 and 2014/0002889 describe an electrophoresis device including a plurality of first and second electrophoretic particles included in an insulating liquid, the first and second particles having different charging characteristics that are different from each other; the device further comprising a porous layer included in the insulating liquid and formed of a fibrous structure. These patent applications are not full color displays in the sense in which that term is used below.

See also U.S. Patent Application Publication No. 2011/0134506 and the aforementioned application Ser. No. 14/277,107; the latter describes a full color display using three different types of particles in a colored fluid, but the presence of the colored fluid limits the quality of the white state which can be achieved by the display.

To obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

Conventionally, each pixel electrode has associated therewith a capacitor electrode such that the pixel electrode and the capacitor electrode form a capacitor; see, for example, International Patent Application WO 01/07961. In some embodiments, N-type semiconductor (e.g., amorphous silicon) may be used to from the transistors and the "select" and "non-select" voltages applied to the gate electrodes can be positive and negative, respectively.

SUMMARY OF INVENTION

The reset of the display ideally erases any memory of a previous state, including remnant voltages and pigment configurations specific to previously-displayed colors, and allows a multi-particle electrophoretic display to reliably achieve the same color state with the same drive scheme. In general, the inventive reset pulses include a high (magnitude) positive voltage followed by a lower (magnitude) negative voltage, and the (time) length of the positive voltage pulse must be shorter than the (time) length of the negative voltage pulse. The clearing waveform may be DC-balanced or DC-imbalanced. The reset pulses may include two or more different sets of high (magnitude) positive voltages and two or more different sets of a lower (magnitude) negative voltage. For example, a first part of the reset pulse may include a push-pull sequence to achieve a universal color initiation state, e.g., magenta, to achieve the best possible clearing. The second part comprises a white-like neutral state, which is the state from which all subsequent colors can be made with simplified push pull color transitions.

In one aspect, the invention includes a method of driving an electrophoretic display including an electrophoretic medium having four different types of electrophoretic particles, each type of electrophoretic particle having a distinct color and a distinct combination of charge polarity and charge magnitude. The method includes providing a clearing pulse comprising a first set of impulses of magnitude $V_1$ and length $t_1$ that alternate with impulses of magnitude $V_2$ and length $t_2$, where $V_1$ is a positive voltage and $V_2$ is a negative voltage of lower magnitude than $V_1$, and a second set of impulses of magnitude $V_3$ and length $t_3$ that alternate with impulses of length $V_4$ and length $t_4$, wherein the ratio $V_1 \cdot t_1/V_2 \cdot t_2$ is greater than the ratio $V_3 \cdot t_3/V_4 \cdot t_4$ and providing a push-pull color addressing pulse having a push impulse of magnitude $V_5$ and length $t_5$ and a pull impulse of magnitude $V_6$ and length $t_6$, wherein $V_5$ and $V_6$ have opposite polarities.

In some embodiments, the electrophoretic display includes two types of positively-charged electrophoretic particles with different charge magnitudes, and two types of negatively-charged electrophoretic particles with different charge magnitudes. In some embodiments, the two types of positively-charged particles are cyan and magenta in color and the two types of negatively-charged particles are white and yellow in color. In some embodiments, the method also comprises providing at least three impulses of magnitude $V_1$ and length $t_1$, at least three impulses of magnitude $V_2$ and length $t_2$, at least three impulses of magnitude $V_3$ and length $t_3$, and at least three impulses of length $V_4$ and length $t_4$. In some embodiments, at least two impulses of magnitude $V_1$ and length $t_1$ are interspersed with an impulse of magnitude $V_2$ and length $t_2$, and at least two impulse of magnitude $V_3$ and length $t_3$ are interspersed with an impulse of magnitude $V_4$ and length $t_4$. In some embodiments, the method further comprises providing a DC balancing pulse, including a first DC balance impulse of magnitude $V_7$ and length $t_7$ and a second DC balance impulse of magnitude $V_8$ and length $t_8$, wherein $V_7$ and $V_8$ have opposite polarities, wherein the sum of the voltage-time areas of all of the positive voltage pulses is equal to the sum of the voltage-time areas of all of the negative voltage pulses. Such a feature may be expressed as $$\Sigma_{i=1}^{n} V_i \cdot t_i = 0$$

where n=1-8, and $V_n$ and $t_n$ are as defined above. In some embodiments, the DC balancing pulse precedes the clearing pulse and the push-pull color addressing pulse. In some embodiments, the DC balancing pulse is between the clearing pulse and the push-pull color addressing pulse.

In some embodiments, the electrophoretic display comprises a first light-transmissive electrode layer, a second electrode layer comprising a plurality of pixel electrodes, and an electrophoretic layer comprising the electrophoretic medium disposed between the first light-transmissive electrode layer and the second electrode layer. In some embodiments, the electrophoretic layer comprises a plurality of microcells containing the electrophoretic medium. In some embodiments, the electrophoretic layer comprises a plurality of microcapsules containing the electrophoretic medium.

BRIEF DESCRIPTION OF DRAWINGS

FIG. 1 is equivalent to FIG. 6 of U.S. Pat. No. 10,593,272.

FIG. 3A shows in schematic form four types of different pigment particles used in a multi-particle electrophoretic medium.

DETAILED DESCRIPTION

Figure 1:
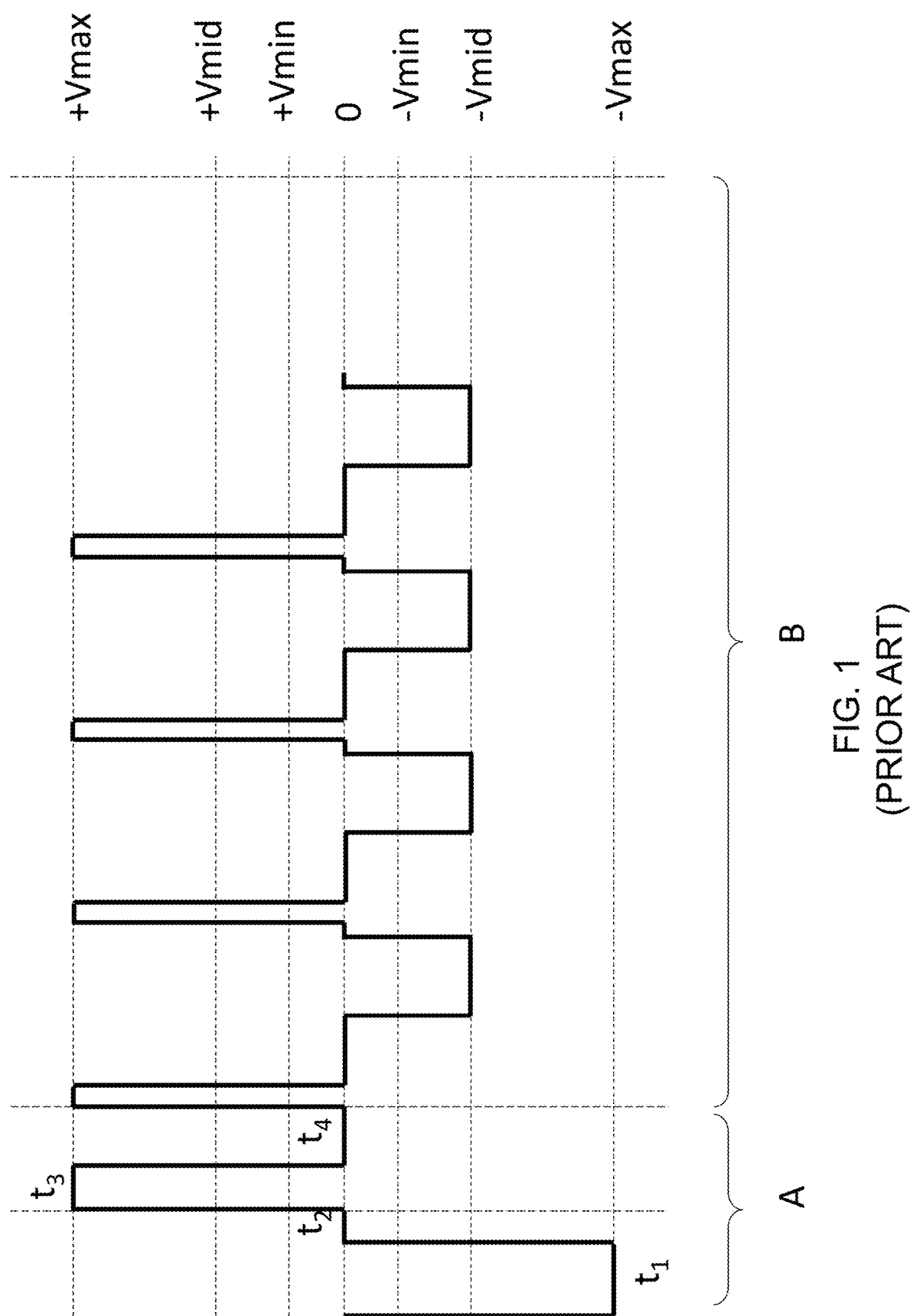
FIG. 1 shows a prior art clearing waveform for an ACeP-type electrophoretic display.

The invention details methods for efficiently clearing previous state information when driving a multi-particle color electrophoretic medium, for example, wherein at least two of the particles are colored and subtractive and at least one of the particles is scattering. Typically, such a system includes a white particle and cyan, yellow, and magenta subtractive primary colored particles. Such a system is shown schematically in FIG. 2, and it can provide white, yellow, red, magenta, blue, cyan, green, and black at every pixel.

In the instance of ACeP, each of the eight principal colors (red, green, blue, cyan magenta, yellow, black and white) corresponds to a different arrangement of the four pigments, such that the viewer only sees those colored pigments that are on the viewing side of the white pigment (i.e., the only pigment that scatters light). It has been found that waveforms to sort the four pigments into appropriate configurations to make these colors need at least five voltage levels (high positive, low positive, zero, low negative, high negative). See FIG. 2. To achieve the wider range of colors, additional voltage levels must be used for finer control of the pigments, e.g., seven voltage levels, e.g., nine voltage levels. However, as discussed in the Background, it has been found that not all second color states are available from all first color states, which results in more complicated (and longer) driving waveforms. The invention described herein overcomes this difficulty by providing a push-pull clearing waveform of unmatched voltages. Clearing waveforms of this type allow fast transitions between most color states without noticeable flashing.

The term color as used herein includes black and white. White particles are often of the light scattering type. The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention, The three particles providing the three subtractive primary colors, e.g., for an ACeP system, may be substantially non-light-scattering ("SNLS"). The use of SNLS particles allows mixing of colors and provides for more color outcomes than can be achieved with the same number of scattering particles. These thresholds must be sufficiently separated relative to the voltage driving levels for avoidance of cross-talk between particles, and this separation necessitates the use of high addressing voltages for some colors. In addition, addressing the colored particle with the highest threshold also moves all the other colored particles, and these other particles must subsequently be switched to their desired positions at lower voltages. Such a step-wise color-addressing scheme produces flashing of unwanted colors and a long transition time.

Figure 2:
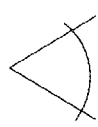
FIG. 2 is a schematic cross-section showing the positions of the various colored particles in an electrophoretic medium of the present invention when displaying black, white, the three subtractive primary and the three additive primary colors.

FIG. 2 of the accompanying drawings is a schematic cross-section showing the positions of the various particles in an ACeP-type electrophoretic medium when displaying black, white, the three subtractive primary colors and the three additive primary colors. In FIG. 2, it is assumed that the viewing surface of the display is at the top (as illustrated), i.e., a user views the display from this direction, and light is incident from this direction. As already noted, in preferred embodiments only one of the four particles used in the electrophoretic medium of the present invention substantially scatters light, and in FIG. 2 this particle is assumed to be the white pigment. This light-scattering white particle forms a white reflector against which any particles above the white particles (as illustrated in FIG. 2) are viewed. Light entering the viewing surface of the display passes through these particles, is reflected from the white particles, passes back through these particles and emerges from the display. Thus, the particles above the white particles may absorb various colors and the color appearing to the user is that resulting from the combination of particles above the white particles. Any particles disposed below (behind from the user's point of view) the white particles are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 2), there are no particles above the white particles and the pixel simply displays a white color, When a single particle is above the white particles, the color of that single particle is displayed, yellow, magenta and cyan in Situations [B], [D] and [F] respectively in FIG. 2. When two particles lie above the white particles, the color displayed is a combination of those of these two particles; in FIG. 2, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 2), all the incoming light is absorbed by the three subtractive primary colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black).

It would not be easy to render the color black if more than one type of colored particle scattered light.

FIG. 2 shows an idealized situation in which the colors are uncontaminated (i.e., the light-scattering white particles completely mask any particles lying behind the white particles). In practice, the masking by the white particles may be imperfect so that there may be some small absorption of light by a particle that ideally would be completely masked. Such contamination typically reduces both the lightness and the chroma of the color being rendered. In the electrophoretic medium of the present invention, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above. (Hereinafter, "primary colors" will be used to refer to the eight colors, black, white, the three subtractive primaries and the three additive primaries as shown in FIG. 2.)

Figure 3B:
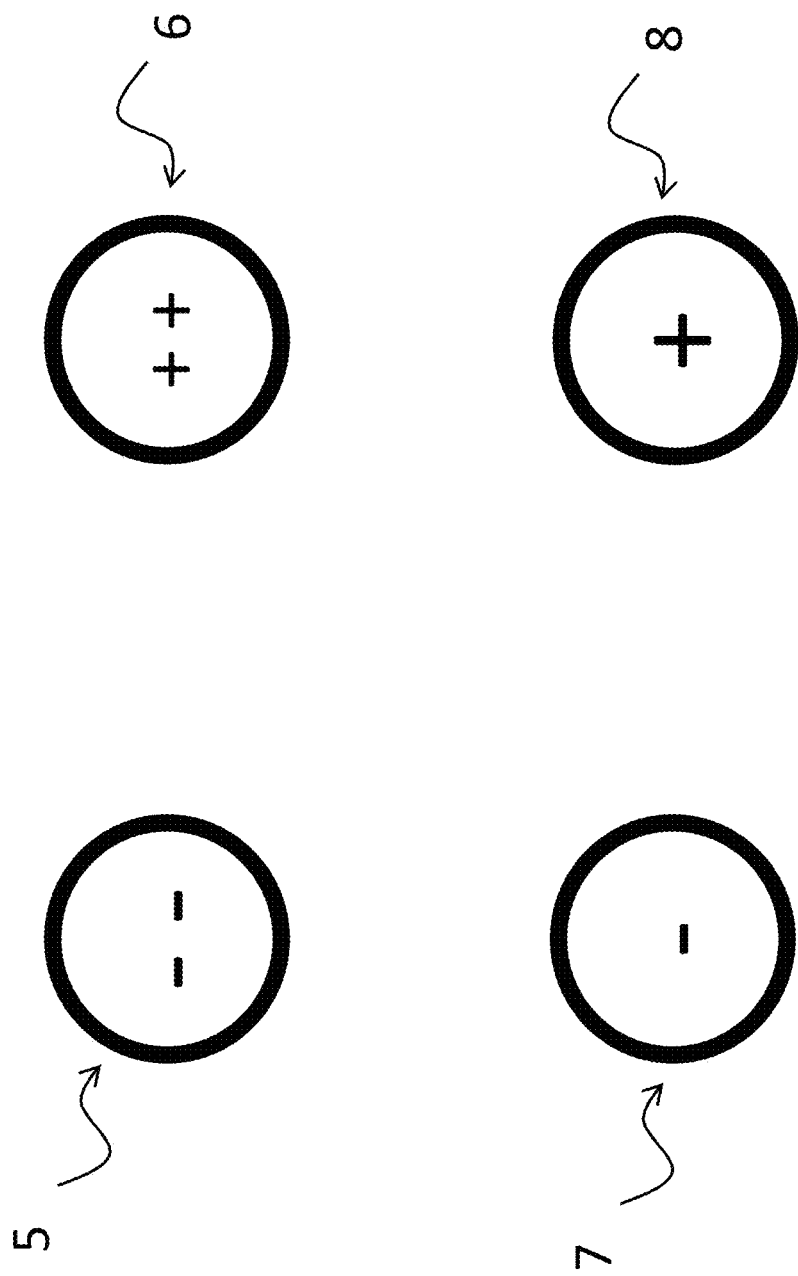
FIG. 3B shows in schematic form four types of different pigment particles used in a multi-particle electrophoretic medium.

FIGS. 3A and 3B show schematic cross-sectional representations of the four pigment types (1-4; 5-8) used in an ACeP-type electrophoretic display. In FIG. 3A, the polymer shell adsorbed to the core pigment is indicated by the dark shading, while the core pigment itself is shown as unshaded. A wide variety of forms may be used for the core pigment: spherical, acicular or otherwise anisometric, aggregates of smaller particles (i.e., "grape clusters"), composite particles comprising small pigment particles or dyes dispersed in a binder, and so on as is well known in the art. The polymer shell may be a covalently-bonded polymer made by grafting processes or chemisorption as is well known in the art, or may be physisorbed. onto the particle surface. For example, the polymer may be a block copolymer comprising insoluble and soluble segments.

In the embodiment of FIG. 3A, first and second particle types preferably have a more substantial polymer shell than third and fourth particle types. The light-scattering white particle is of the first or second type (either negatively or positively charged). In the discussion that follows it is assumed that the white particle bears a negative charge (i.e., is of Type 1), but it will be clear to those skilled in the art that the general principles described will apply to a set of particles in which the white particles are positively charged.

Additionally, as depicted in FIG. 3B, it is not required that the first and second particle types have differential polymer shells as compared to the third and fourth particle types. As shown in FIG. 3B, sufficient differential charge on the four particles will allow for electrophoretic control of the particles and creation of the desired color at the viewing surface. For example, particle 5 may have a negative charge of greater magnitude than particle 7, while particle 6 has a greater magnitude positive charge as compared to particle 8. It is also possible that other combinations of polymer functionality and charge (or particle size) can be used; however, it must be the case that all four particles can be separated from each other in the presence of suitable electric fields, e.g., lower voltage electric fields that can be produced with commercial digital electronics.

In a system of FIG. 3A, the present invention the electric field required to separate an aggregate formed from mixtures of particles of types 3 and 4 in the suspending solvent containing a charge control agent is greater than that required to separate aggregates formed from any other combination of two types of particle. The electric field required to separate aggregates formed between the first and second types of particle is, on the other hand, less than that required to separate aggregates formed between the first and fourth particles or the second and third particles (and of course less than that required to separate the third and fourth particles).

In FIG. 3A the core pigments comprising the particles are shown as having approximately the same size, and the zeta potential of each particle, although not shown, is assumed to be approximately the same. What varies is the thickness of the polymer shell surrounding each core pigment. As shown in FIG. 3A, this polymer shell is thicker for particles of types 1 and 2 than for particles of types 3 and 4.

Figure 3C:
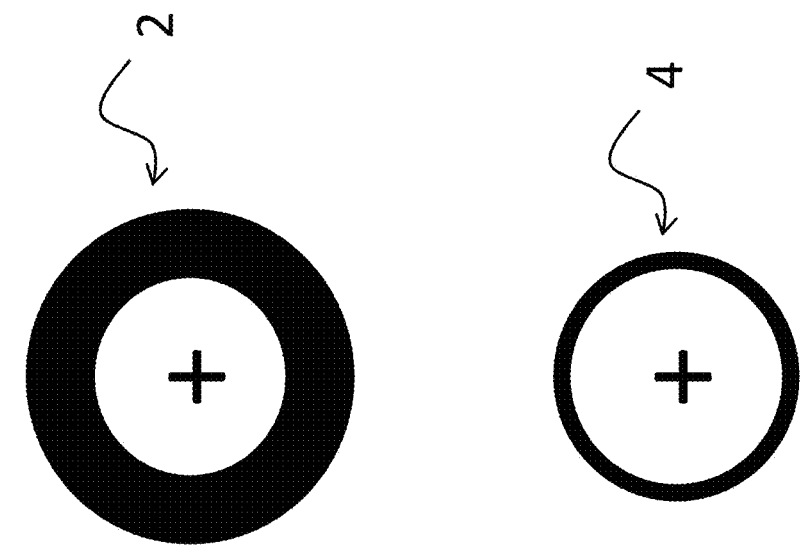
FIG. 3C shows in schematic form four types of different pigment particles used in a multi-particle electrophoretic medium.
Figure 3C:
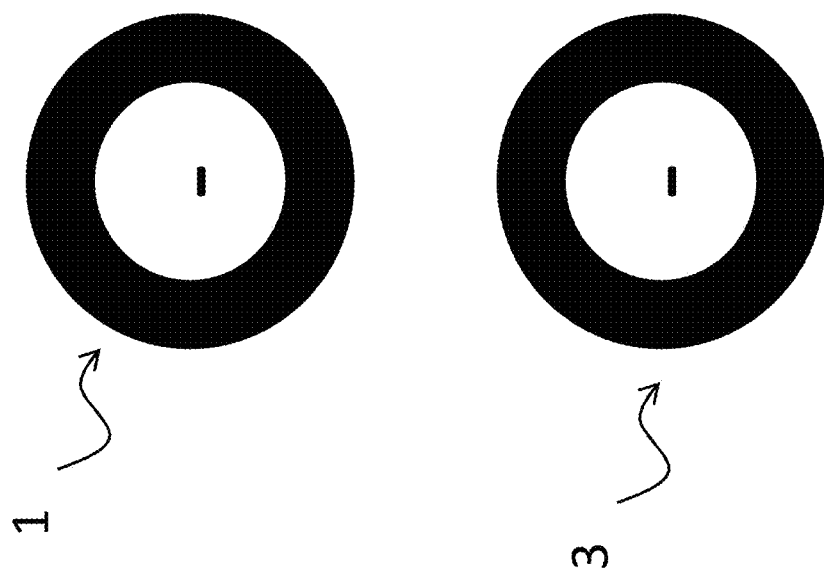

It is not necessary in the present invention that all the colored pigments behave as described above with reference to FIGS. 3A and 3B. As shown in FIG. 3C, the third particle may have a substantial polymer shell and may have a wide range of charge, including weakly positive. In this case the surface chemistry of the third particle must be different from that of the first particle. For example, the first particle my bear a covalently-attached silane shell to which is grafted a polymer that may be comprised of acrylic or styrenic monomers that are preferably hydrophobic. The third particle may comprise a polymer shell that is not covalently attached, but is deposited onto the surface of the core particle by dispersion polymerization. In such cases the invention is not limited to the mechanism described above with reference to FIGS. 3A and 3B.

To obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner. The time between addressing in the display is known as a "frame." Thus, a display that is updated at 60 Hz has frames that are 16 msec.

Conventionally, each pixel electrode has associated therewith a capacitor electrode such that the pixel electrode and the capacitor electrode form a capacitor; see, for example, International Patent Application WO 01/07961. In some embodiments, N-type semiconductor (e.g., amorphous silicon) may be used to from the transistors and the "select" and "non-select" voltages applied to the gate electrodes can be positive and negative, respectively.

Figure 4:
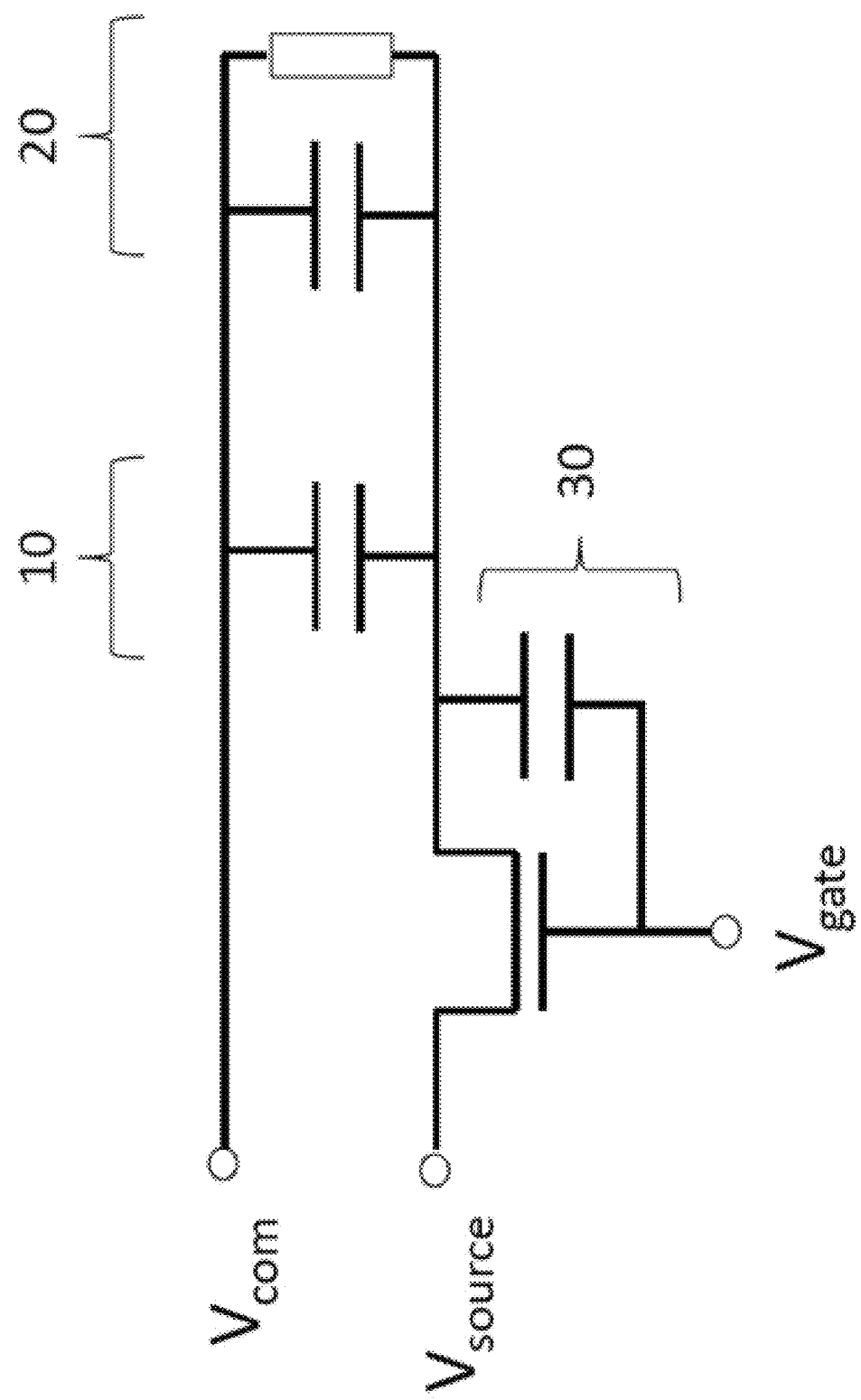
FIG. 4 illustrates an exemplary equivalent circuit of a single pixel of an electrophoretic display.

FIG. 4 of the accompanying drawings depicts an exemplary equivalent circuit of a single pixel of an electrophoretic display. As illustrated, the circuit includes a capacitor 10 formed between a pixel electrode and a capacitor electrode. The electrophoretic medium 20 is represented as a capacitor and a resistor in parallel. in some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. In some embodiments, to compensate for the unwanted "kickback voltage", a common potential $V_{com}$, may be supplied to the top plane electrode and the capacitor electrode associated with each pixel, such that, when $V_{com}$ is set to a value equal to the kickback voltage ($V_{KB}$), every voltage supplied to the display may be offset by the same amount, and no net DC-imbalance experienced.

A set of waveforms for driving a color electrophoretic display having four particles is described in U.S. Pat. No. 9,921,451, incorporated by reference herein. In U.S. Pat. No.

9,921,451, seven different voltages are applied to the pixel electrodes: three positive, three negative, and zero. However, in some embodiments, the maximum voltages used in these waveforms are higher than that can be handled by amorphous silicon thin-film transistors. In such instances, suitable high voltages can be obtained by the use of top plane switching. It is costly and inconvenient, however, to use as many separate power supplies as there are $V_{com}$ settings when top plane switching is used. Furthermore, top plane switching is known to increase kickback, thereby degrading the stability of the color states.

Methods for fabricating an ACeP-type electrophoretic display have been discussed in the prior art. The electrophoretic fluid may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive. Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

Figure 5:
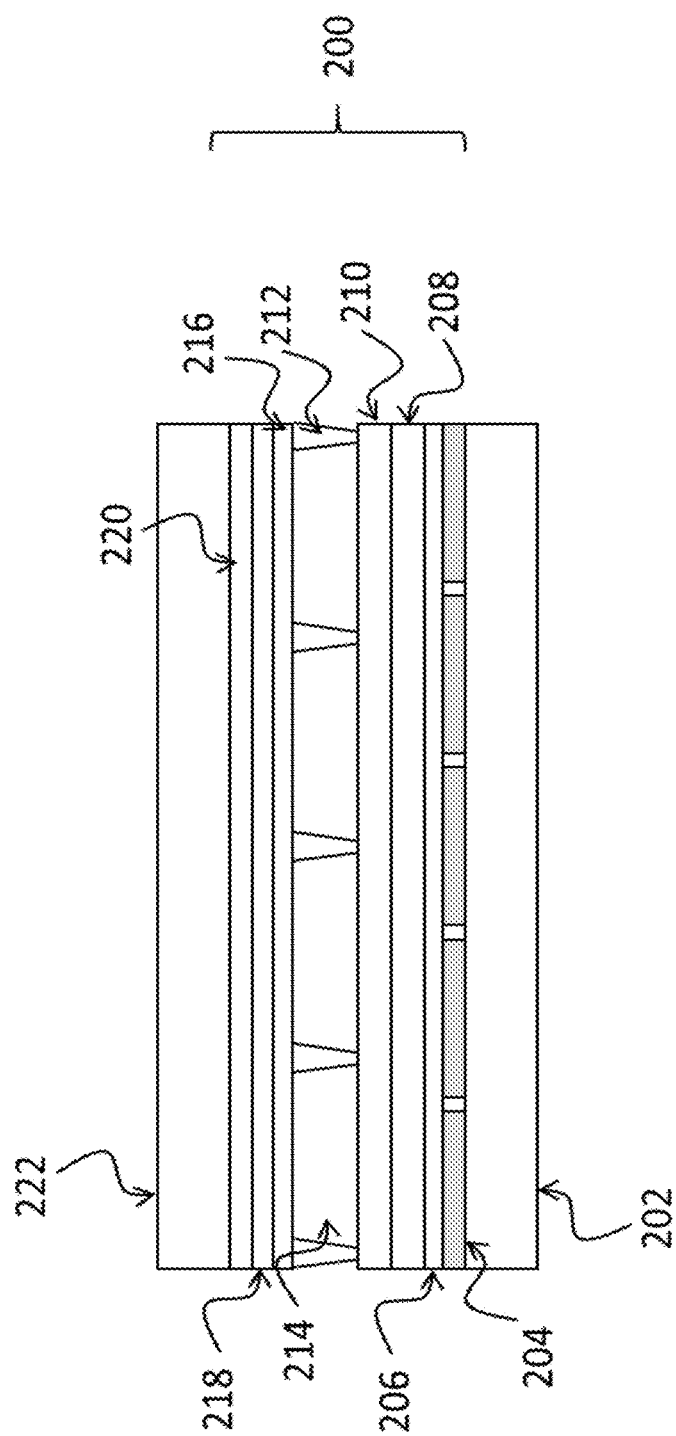
FIG. 5 shows the layers of an exemplary electrophoretic color display.

FIG. 5 shows a schematic, cross-sectional drawing (not to scale) of a display structure 200 of an ACeP-type electrophoretic display. In display 200 the electrophoretic fluid is illustrated as being confined to microcups, although equivalent structures incorporating microcapsules may also be used. Substrate 202, which may be glass or plastic, bears pixel electrodes 204 that are either individually addressed segments or associated with thin film transistors in an active matrix arrangement. (The combination of substrate 202 and electrodes 204 is conventionally referred to as the back plane of the display.) Layer 206 is an optional dielectric layer according to the invention applied to the backplane. (Methods for depositing a suitable dielectric layer are described in U.S. patent application Ser. No. 16/862,750, incorporated by reference.) The front plane of the display comprises transparent substrate 222 that bears a transparent, electrically conductive coating 220. Overlying electrode layer 220 is an optional dielectric layer 218. Layer (or layers) 216 are polymeric layer(s) that may comprise a primer layer for adhesion of microcups to transparent electrode layer 220 and some residual polymer comprising the bottom of the microcups. The walls of the microcups 212 are used to contain the electrophoretic fluid 214. The microcups are sealed with layer 210 and the whole front plane structure is adhered to the backplane using electrically-conductive adhesive layer 208. Processes for forming the microcups are described in the prior ar, e.g., in U.S. Pat. No. 6,930,818. In some instance, the microcups are less than 20 µm in depth, e.g., less than 15 µm in depth, e.g., less than 12 µm in depth, e.g., about 10 µm in depth, e.g., about 8 µm in depth.

Most commercial electrophoretic displays use amorphous silicon based thin-film transistors (TFTs) in the construction of active matrix backplanes (202/024) because of the wider availability of fabrication facilities and the costs of the various starting materials. Unfortunately, amorphous silicon thin-film transistors become unstable when supplied gate voltages that would allow switching of voltages higher than about +/−15V. Nonetheless, as described below, the performance of ACeP is improved when the magnitudes of the high positive and negative voltages are allowed to exceed +/−15V. Accordingly, as described in previous disclosures, improved performance is achieved by additionally changing the bias of the top light-transmissive electrode with respect to the bias on the backplane pixel electrodes, also known as top-plane switching. Thus, if a voltage of +30V (relative to the backplane) is needed, the top plane may be switched to −15V while the appropriate backplane pixel is switched to +15V. Methods for driving a four-particle electrophoretic system with top-plane switching are described in greater detail in, for example, U.S. Pat. No. 9,921,451.

There are several disadvantages to the top-plane switching approach. Firstly, when (as is typical) the top plane is not pixelated, but is a single electrode extending over the whole surface of the display, its electrical potential affects every pixel in the display. If it is set to match one of the voltages of the largest magnitude available from the backplane (for example, the largest positive voltage) when this voltage is asserted on the backplane there will be no net voltage across the ink. When any other available voltage is supplied to a backplane, there will always be a voltage of negative polarity supplied to any pixel in the display. Thus, if a waveform requires a positive voltage this cannot be supplied to any pixel until the top plane voltage is changed. A typical waveform for use in a multicolor display of the third embodiment uses multiple pulses of both positive and negative polarity, and the lengths of these pulses are not of the same length in waveforms used for making different colors. In addition, the phase of the waveform may be different for different colors: in other words, a positive pulse may precede a negative pulse for some colors, whereas a negative pulse may precede a positive pulse for others. To accommodate such cases, "rests" (i.e., pauses) must be built into the waveforms. In practice, this results in waveforms being much longer (by as much as a factor of two) than they ideally need to be.

Secondly, in top plane switching there are limits to the voltage levels that may be chosen. If the voltages applied to the top plane are denoted $V_{t+}$ and $V_{t-}$, respectively, and those applied to the back plane $V_{b+}$ and $V_{b-}$, respectively, in order to achieve a zero volt condition across the electrophoretic fluid it must be true that $|V_{t+}|=|V_{b+}|$ and $|V_{t-}|=|V_{b-}|$. However, it is not necessary for the magnitudes of the positive and negative voltages to be the same.

In prior embodiments of the Advanced Color electronic Paper (ACeP®), the waveform (voltage against time curve) applied to the pixel electrode of the backplane of a display of the invention is described and plotted, while the front electrode is assumed to be grounded (i.e., at zero potential). The electric field experienced by the electrophoretic medium is of course determined by the difference in potential between the backplane and the front electrode and the distance separating them. The display is typically viewed through its front electrode, so that it is the particles adjacent the front electrode which control the color displayed by the pixel, and if it is sometimes easier to understand the optical transitions involved if the potential of the front electrode relative to the backplane is considered; this can be done simply by inverting the waveforms discussed below.

Figure 6:
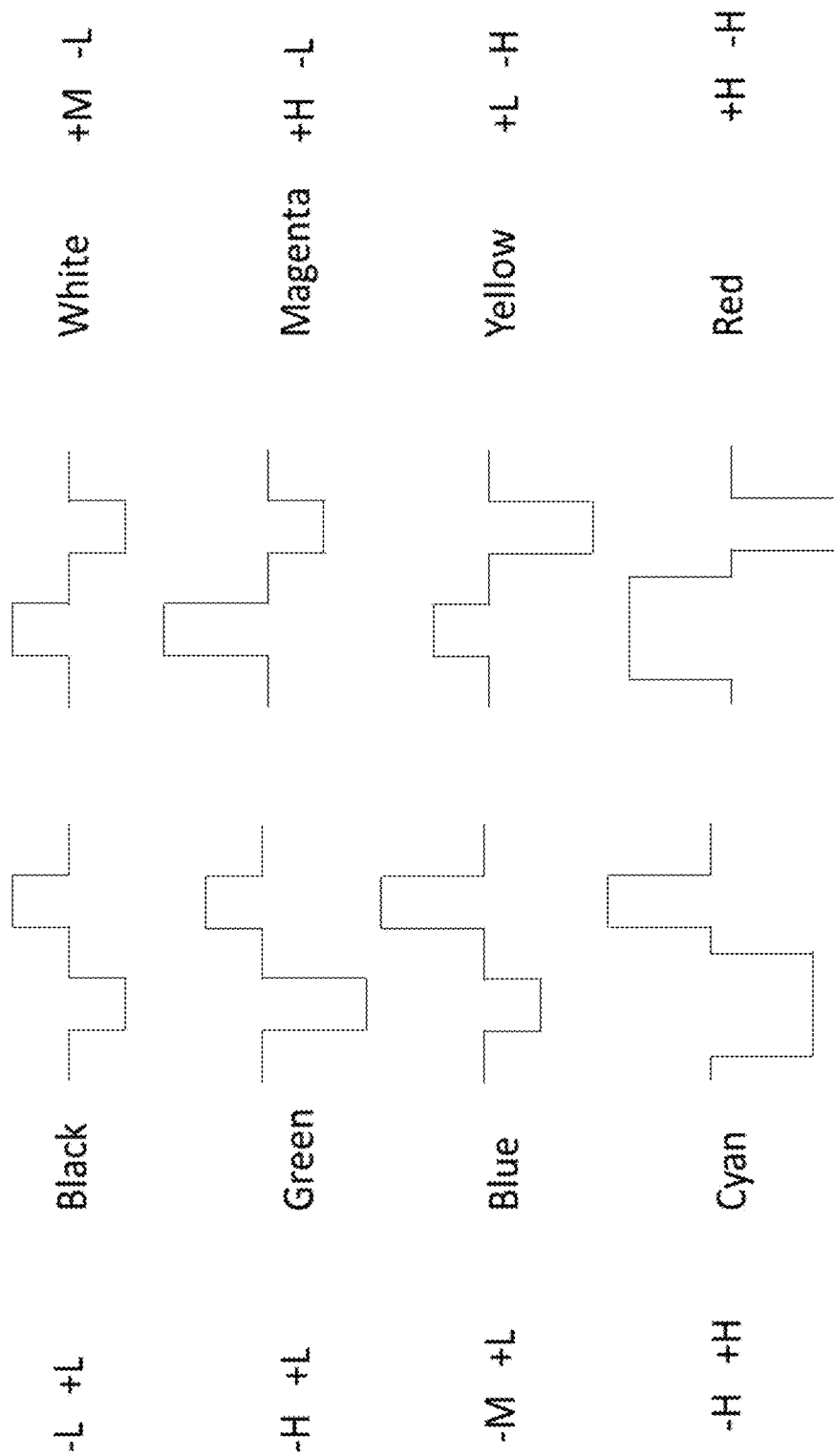
FIG. 6 shows the simple push pull waveforms that can be used to achieve a set of primary colors in an optimized system including one reflective (white) particle, and three subtractive (cyan, yellow, magenta) particles, wherein two particles are negatively charged, but have different magnitudes, and two particles are positively charged, but have different magnitudes.

FIG. 6 shows typical waveforms (in simplified form) used to drive a four-particle color electrophoretic display system described above. Such waveforms have a simple "push-pull" structure: i.e., they consist of a dipole comprising two pulses of opposite polarity. The magnitudes and lengths of these pulses determine the color obtained. At a minimum, there should be five such voltage levels. FIG. 6 shows high and low positive and negative voltages, as well as zero volts. Typically, "low" (L) refers to a range of about five—15V, while "high" (H) refers to a range of about 15-30V. In general, the higher the magnitude of the "high" voltages, the better the color gamut achieved by the display. The "medium" (M) level is typically around 15V; however, the value for M will depend somewhat on the composition of the particles, as well as the environment of the electrophoretic medium. If only three voltages are available (i.e., $+V_{high}$, 0, and $-V_{high}$) it may be possible to achieve the same result as addressing at a lower voltage (say, $V_{high}$/n where n is a positive integer>1) by addressing with pulses of voltage $V_{high}$ but with a duty cycle of 1/n. An electrophoretic particle set useful with the push-pull waveforms of FIG. 6 may include a negatively-charged white particle, a negatively-charged yellow particle, a positively-charged magenta particle and a positively-charged cyan particle.

In alternate embodiments, seven level drivers may be used to directly address each pixel without the need for top plane switching. Implementing seven-level drivers with sufficient voltage amplitude is difficult with standard amorphous silicon backplanes, however. It has been found that using control transistors from less-common materials, which have a higher electron mobility, allow the transistors to switch larger control voltages, for example +/-30V, as needed to implement seven-level driving. Newly-developed active matrix backplanes may include thin film transistors incorporating metal oxide materials, such as tungsten oxide, tin oxide, indium oxide, and zinc oxide. In these applications, a channel formation region is formed for each transistor using such metal oxide materials, allowing faster switching of higher voltages, e.g., within the range of about -27V to +27V. Such transistors typically include a gate electrode, a gate-insulating film (typically $SiO_2$), a metal source electrode, a metal drain electrode, and a metal oxide semiconductor film over the gate-insulating film, at least partially overlapping the gate electrode, source electrode, and drain electrode. Such backplanes are available from manufacturers such as Sharp/Foxconn, LG, and BOE. One preferred metal oxide material for such applications is indium gallium zinc oxide (IGZO). IGZO-TFT has 20-50 times the electron mobility of amorphous silicon. By using IGZO TFTs in an active matrix backplane, it is possible to provide voltages of greater than 30V via a suitable display driver.

Herein the term "frame" refers to a single update of all the rows in the display. It will be clear to one of ordinary skill in the art that in a display of the invention driven using a thin-film transistor (TFT) array the available time increments on the abscissa of FIG. 6 will typically be quantized by the frame rate of the display. Likewise, it will be clear that the display is addressed by changing the potential of the pixel electrodes relative to the front electrode and that this may be accomplished by changing the potential of either the pixel electrodes or the front electrode, or both. In the present state of the art, typically a matrix of pixel electrodes is present on the backplane, whereas the front electrode is common to all pixels. Therefore, when the potential of the front electrode is changed, the addressing of all pixels is affected. The basic structure of the waveform described above with reference to FIG. 6 is the same whether or not varying voltages are applied to the front electrode.

Figure 7A:
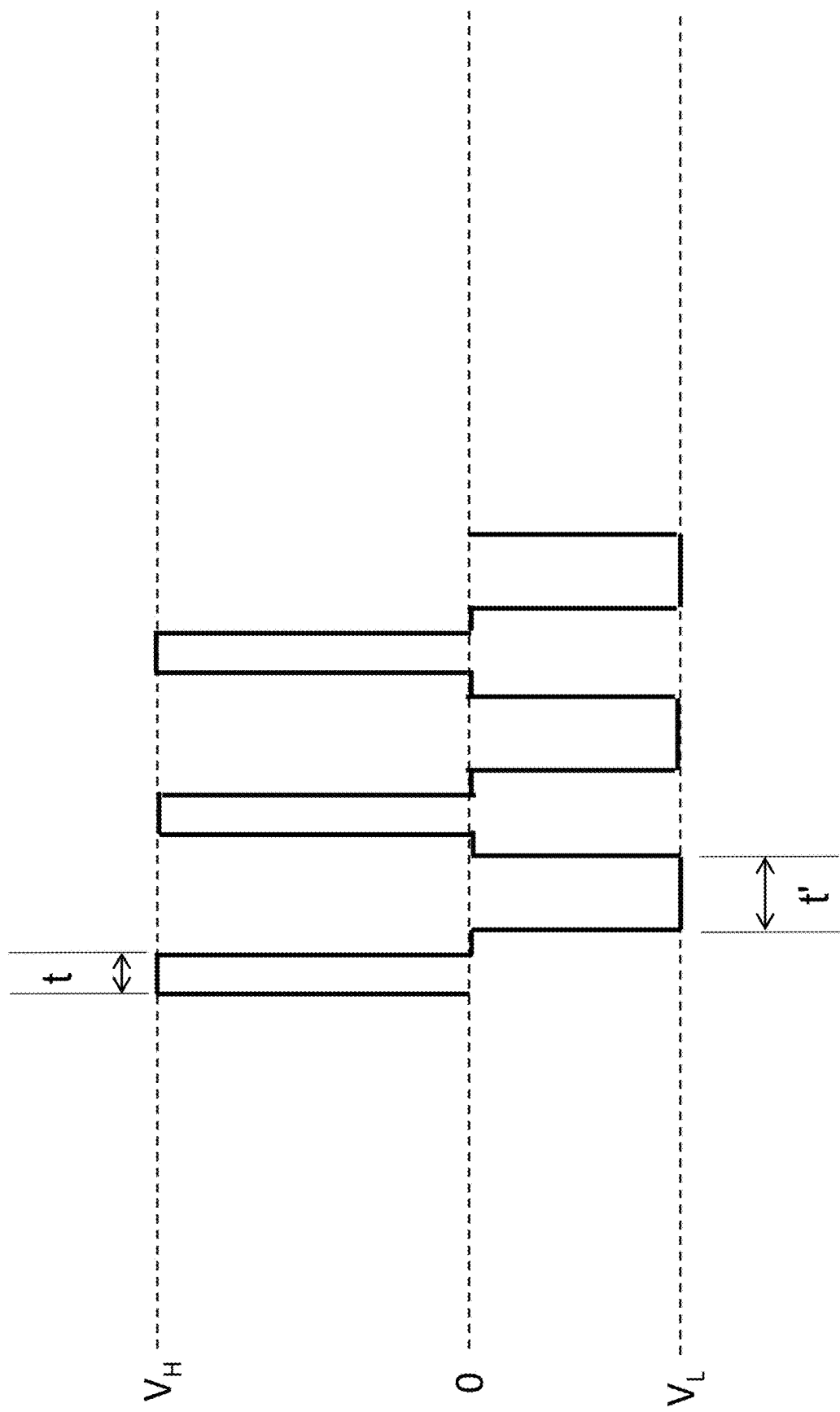
FIG. 7A is a generalized clearing pulse, having alternating pulses of $V_1$, $t_1$ and $V_2$, $t_2$. $V_1$ is greater in magnitude than $V_2$, and $t_1$ is shorter than $t_2$.
Figure 7B:
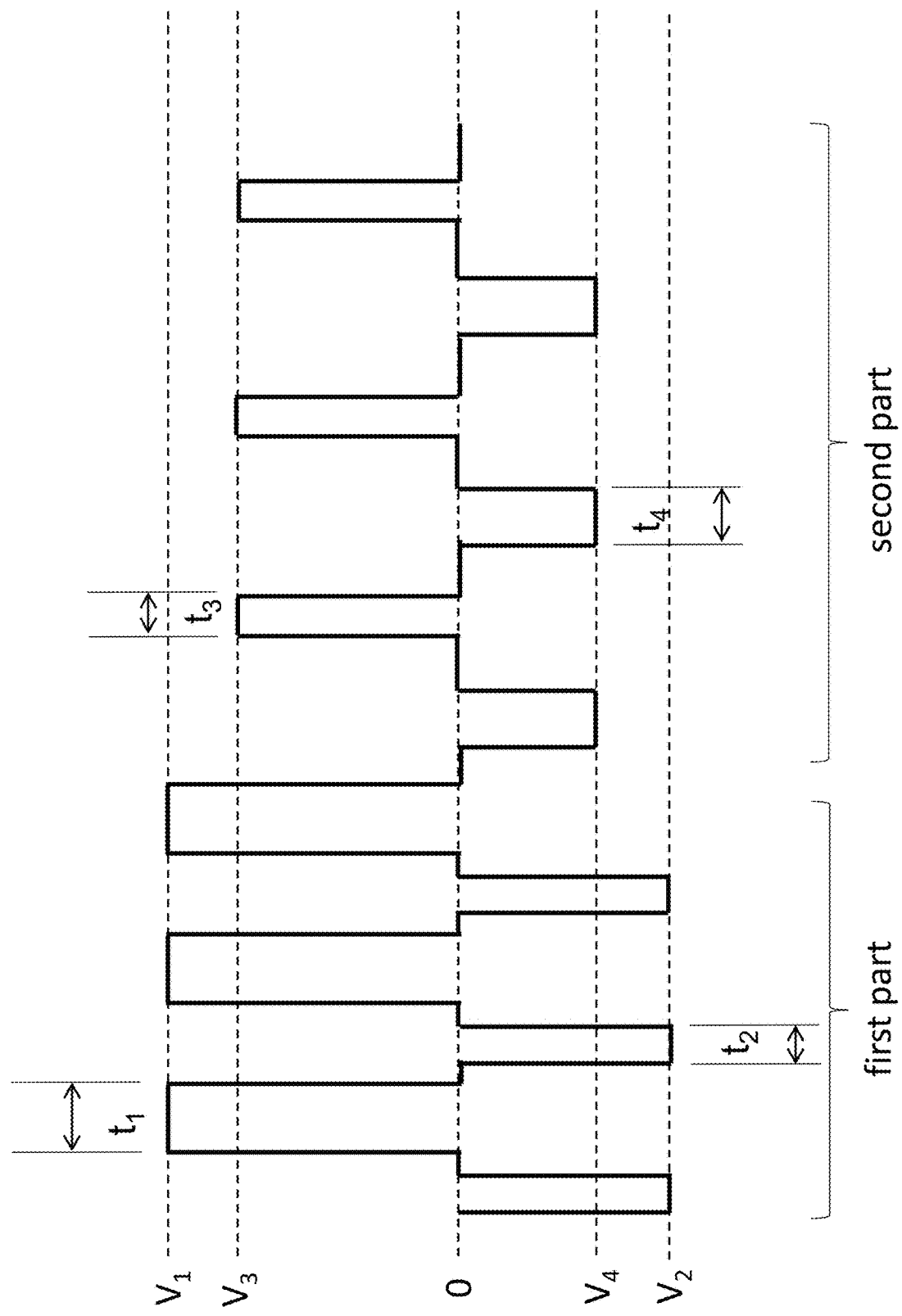
FIG. 7B is a generalized clearing pulse, including a first portion having alternating pulses of $V_1$, $t_1$ and $V_2$, $t_2$, and a second portion having alternating pulses of $V_3$, $t_3$, and $V_4$; $t_4$.

The reset of the display (i.e., clearing pulse) ideally erases any memory of a previous state, including remnant voltages and pigment configurations specific to previously-displayed colors, and allows a multi-particle electrophoretic display to reliably achieve the same color state with the same drive scheme. A generalized clearing pulse is shown in FIG. 7A. In general, the inventive reset pulses includes a high positive voltage ($V_H$) followed by a lower negative voltage ($V_L$), and the length of the positive voltage pulse (t) must be shorter than that of the negative voltage pulse (t'). Each period of voltage as a function of time may be referred to as an "impulse", and each impulse i may be described as having a voltage $V_i$ and a time $t_i$. The waveform may be DC-balanced or DC-imbalanced. The waveform may be DC balanced by adding additional impulses that result in the sum of the voltage-time areas of all of the positive voltage pulses is equal to the sum of the voltage-time areas of all of the negative voltage pulses. Mathematically, DC balancing can be represented as $$\Sigma_{i=1}^{n} V_i \cdot t_i = 0$$

where n=1-8, and $V_n$ and $t_n$ are as defined above. Furthermore, the magnitude and duration of each impulse in a push-pull sequence may be varied, and optionally "rests" (i.e., periods during which no voltage is applied) may be inserted between the impulses. In some embodiments, In other instances, the clearing waveform includes two parts, each specifically designed for a particular purpose. For example, as shown in FIG. 7B, a first part of the prior-state clearing phase implements a push-pull sequence to achieve a universal color initiation state, e.g., magenta, to achieve the best possible clearing. The second part comprises a white-like neutral state, which is the state from which all subsequent colors can be made with simplified push pull color transitions. in some embodiments, the first part includes pulses of magnitude $V_1$ and length $t_1$ that alternate with pulses of magnitude $V_2$ and length $t_2$, where $V_1$ is a positive voltage and $V_2$ a negative voltage of lower magnitude than $V_1$. In such embodiments, the second part includes pulses of magnitude $V_3$ and length $t_3$ that alternate with pulses of length $V_4$ and length $t_4$. The ratio $V_1 \cdot t_1 / V_2 \cdot t_2$ is greater than the ratio $V_3 \cdot t_3 / V_4 \cdot t_4$.

Figure 8:
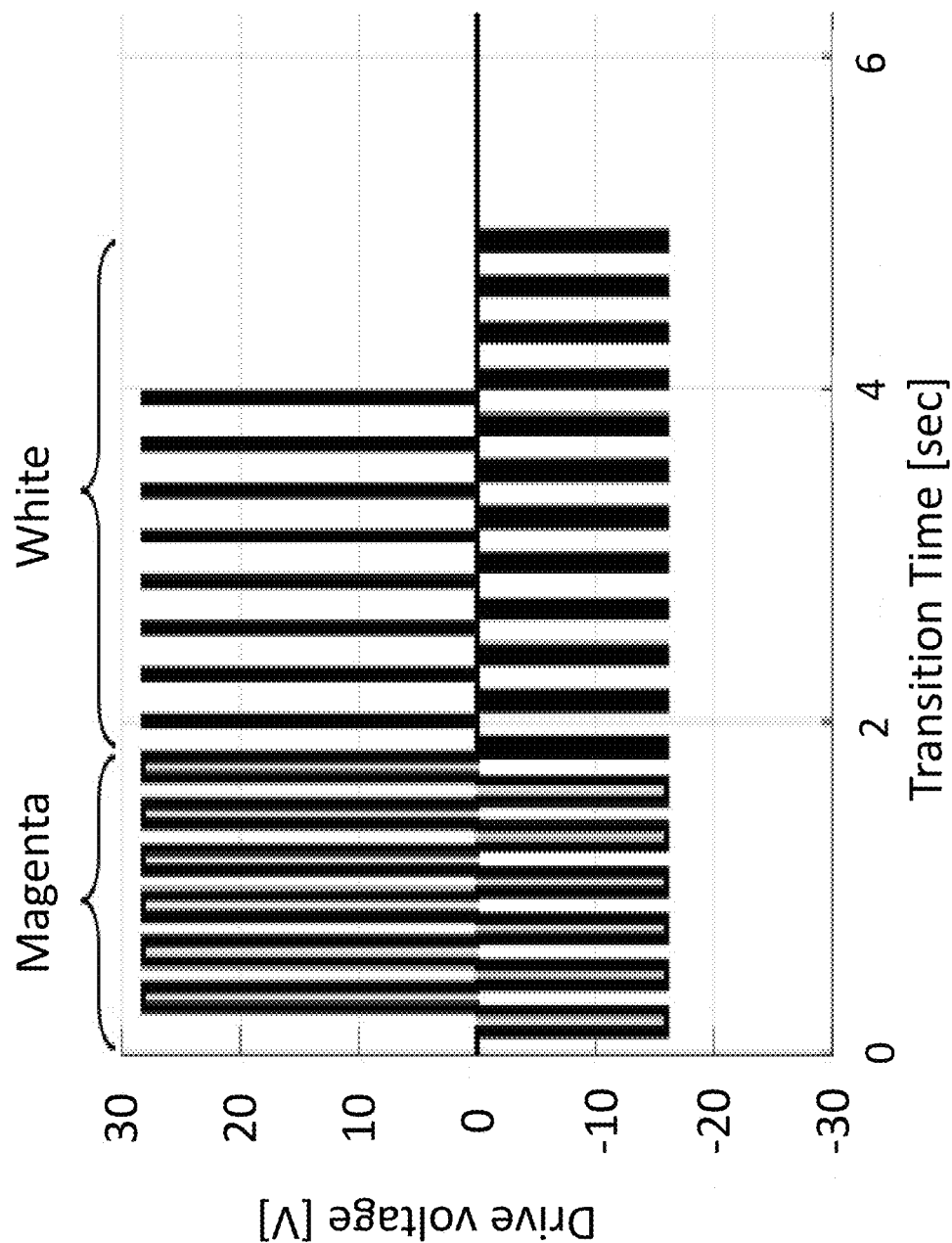
FIG. 8 is a specific example of a clearing pulse, including a first portion that drives an ACeP-type medium toward a magenta color state, and a second portion that drives the ACeP-type medium toward a neutral white color state.

An exemplary waveform may drive the electrophoretic medium from an unknown state to a magenta optical state, and then a neutral white state, for example, as shown in FIG. 8. As described above, in FIG. 8, the impulse difference, i.e. $|V_1 \cdot t_1| - |V_2 \cdot t_2|$ is greater for a sequence rendering a magenta state than for a sequence rendering a white state.

Figure 9:
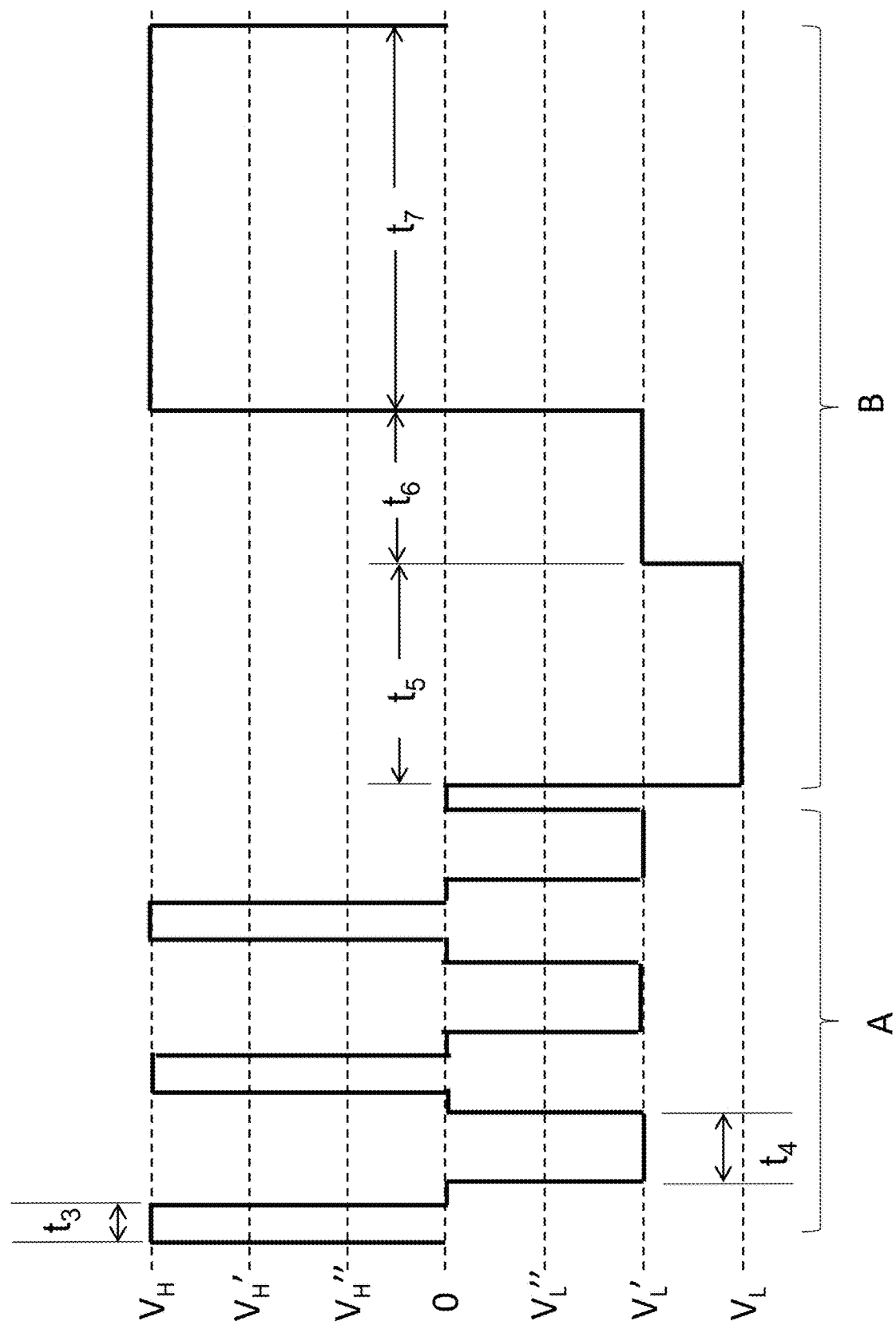
FIG. 9 shows an exemplary clearing pulse of the invention coupled to a push-pull waveform suitable to achieve a desired color in an ACeP-type electrophoretic medium, when incorporated into a display having a metal oxide backplane and using a seven-level driver.

The prior state clearing pulses of the invention can be combined with all color waveforms, e.g., as shown in FIG. 6. For example, in some of the waveforms described in the aforementioned U.S. Pat. No. 9,921,451, seven different voltages can be applied to the pixel electrodes: three positive, three negative, and zero. FIG. 9 depicts schematically one such waveform used to clear and then display a desired color at a pixel. As shown in FIG. 9, the waveforms for every color have the same basic form: (A) a preliminary series of frames that is used to provide a "reset" of the display to a state from which any color may reproducibly be obtained and during which a DC imbalance equal and opposite to the DC imbalance of the remainder of the waveform is provided, and (B) a series of frames that is particular to the color that is to be rendered. If a DC balance pulse is included in the waveform, the DC balance pulse may come before the clearing pulse, or after the clearing pulse, but before the push-pull color address pulse. it should be realized that FIG. 9 is a generalization of a clearing pulse combined with a color addressing pulse. A two-part clearing pulse of the type shown in FIG. 7B may be used as an alternative to the one part clearing pulse shown in FIG. 9. As such, and the impulses $V_1 \cdot t_1$ and $V_2 \cdot t_2$ would precede impulses $V_3 \cdot t_3$ and $V_4 \cdot t_4$ in FIG. 9.

For comparison, regard FIG. 1 [Prior Art]. In phase A (the reset phase) it is seen that this phase is divided into two sections of equal duration (illustrated by the dotted lines). When top plane switching is used, the top plane will be held at one potential in the first of these sections, and at a potential of the opposite polarity in the second section. In the particular case of FIG. 1, during the first such section the top plane would have been held at $V_pH$, and the backplane at $V_nH$, to achieve a potential drop across the electrophoretic fluid of $V_nH$-$V_pH$ (where the convention is used of referencing the backplane potential relative to that of the top plane). During the second section, the top plane would have been held at $V_nH$, and the backplane at $V_pH$. As shown, during the second section the electrophoretic fluid would have been subjected to a potential of $V_pH$-$V_nH$, the highest potential available. For rendition of certain colors, however, exposure to this high voltage might result in an initial pigment arrangement from which an ideal final configuration would be difficult to achieve. For example, as noted in the prior art, in order to render the color cyan, it is necessary for the magenta pigment (which has the same charge polarity as the cyan pigment) to be tied up in an aggregate with the yellow pigment. Such an aggregate would be split by a high applied potential, and thus the magenta would not be controlled and would contaminate the cyan.

The foregoing discussion of the waveforms, and specifically the discussion of DC balance, ignores the question of kickback voltage. In practice, as previously, every backplane voltage is offset from the voltage supplied by the power supply by an amounts equal to the kickback voltage $V_{KB}$. Thus, if the power supply used provides the three voltages +V, 0, and −V, the backplane would actually receive voltages V+$V_{KB}$, $V_{KB}$, and −V+$V_{KB}$ (note that $V_{KB}$, in the case of amorphous silicon TFTs, is usually a negative number). The same power supply would, however, supply +V, 0, and −V to the front electrode without any kickback voltage offset. Therefore, for example, when the front electrode is supplied with −V the display would experience a maximum voltage of 2V+$V_{KB}$ and a minimum of $V_{KB}$. Instead of using a separate power supply to supply $V_{KB}$ to the front electrode, which can be costly and inconvenient, a waveform may be divided into sections where the front electrode is supplied with a positive voltage, a negative voltage, and $V_{KB}$.

Thus, the invention provides for clearing waveforms for multi-particle electrophoretic displays. Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described. herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

We claim:

1. A method of driving an electrophoretic display including an electrophoretic medium having four different types of electrophoretic particles, each type of electrophoretic particle having a distinct color and a distinct combination of charge polarity and charge magnitude, the method comprising:
   providing at least five voltage levels ($V_H$, $V_H'$, 0, $V_L'$, and $V_L$) to the electrophoretic medium, wherein $V_H$ and $V_H'$ have polarities opposite to $V_L'$, and $V_L$, and wherein the magnitude of $V_H$ is greater than the magnitude of $V_H'$, and wherein the magnitude of $V_L$ is greater than the magnitude of $V_L'$;
   providing a clearing pulse comprising a first set of at least three impulses of magnitude $V_H$ and length $t_3$ that alternate with a second set of at least three impulses of magnitude $V_L'$ and length $t_4$;
   providing a push-pull color addressing pulse having a push impulse of magnitude $V_L$ and length $t_5$ and a pull impulse of magnitude $V_H$ and length $t_7$, and
   providing a DC balancing impulse, of magnitude $V_L'$ and length $t_6$, wherein the sum of the voltage-time areas of all of the positive voltage pulses is equal to the sum of the voltage-time areas of all of the negative voltage pulses, wherein the DC balancing pulse is between the push impulse and the pull impulse of the push-pull color addressing pulse.

2. The method of claim 1, wherein the electrophoretic display includes two types of positively-charged electrophoretic particles with different charge magnitudes, and two types of negatively-charged electrophoretic particles with different charge magnitudes.

3. The method of claim 2, wherein the two types of positively-charged particles are cyan and magenta in color and the two types of negatively-charged particles are white and yellow in color.

4. The method of claim 3, wherein the cyan, magenta, and yellow particles are subtractive color particles, and the electrophoretic medium can present the colors white, yellow, red, magenta, blue, cyan, green, and black at a viewing surface.

5. The method of claim 1, wherein the electrophoretic display comprises a first light-transmissive electrode layer, a second electrode layer comprising a plurality of pixel electrodes, and an electrophoretic layer comprising the electrophoretic medium disposed between the first light-transmissive electrode layer and the second electrode layer.

6. The method of claim 5, wherein the electrophoretic layer comprises a plurality of microcells containing the electrophoretic medium.

7. The method of claim 5, wherein the electrophoretic layer comprises a plurality of microcapsules containing the electrophoretic medium.

8. The method of claim 1, further comprising providing a voltage level VH", which has the same polarity as VH and VH', but is smaller in magnitude than VH'.

9. The method of claim 1, further comprising providing a voltage level VL", which has the same polarity as VL and VL', but is smaller in magnitude than VL'.

* * * * *